United States Patent
Nojiri et al.

(10) Patent No.: US 7,439,964 B2
(45) Date of Patent: Oct. 21, 2008

(54) SCREEN DISPLAY DEVICE

(75) Inventors: Atsushi Nojiri, Setagaya-ku (JP); Kenji Yoshioka, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 306 days.

(21) Appl. No.: 10/530,611

(22) PCT Filed: Jul. 20, 2004

(86) PCT No.: PCT/JP2004/010597

§ 371 (c)(1),
(2), (4) Date: Apr. 7, 2005

(87) PCT Pub. No.: WO2005/008625

PCT Pub. Date: Jan. 27, 2005

(65) Prior Publication Data

US 2006/0066506 A1  Mar. 30, 2006

(30) Foreign Application Priority Data

Jul. 23, 2003 (JP) .............................. 2003-278133

(51) Int. Cl.
*G09G 5/00* (2006.01)
(52) U.S. Cl. ........................ 345/204; 345/1.1
(58) Field of Classification Search ................ 345/204, 345/1.1, 87
See application file for complete search history.

(56) References Cited

U.S. PATENT DOCUMENTS

| | | | | |
|---|---|---|---|---|
| 5,694,141 A * | 12/1997 | Chee | ............................ | 345/3.1 |
| 6,323,849 B1 * | 11/2001 | He et al. | ....................... | 345/204 |
| 6,323,894 B1 * | 11/2001 | Katz | ......................... | 348/14.08 |
| 6,351,705 B1 * | 2/2002 | Yoshioka | ...................... | 701/200 |
| 6,970,173 B2 * | 11/2005 | Ciolac | .......................... | 345/544 |
| 6,970,179 B1 * | 11/2005 | Trenary et al. | .............. | 345/671 |
| 2004/0075622 A1 * | 4/2004 | Shiuan et al. | ................. | 345/1.1 |

FOREIGN PATENT DOCUMENTS

| | | |
|---|---|---|
| JP | 09-128198 A | 5/1997 |
| JP | 10-288528 | 10/1998 |
| JP | 11-119753 | 4/1999 |
| JP | 2000-3164 | 1/2000 |
| JP | 2000-66649 | 3/2000 |

OTHER PUBLICATIONS

International Search Report corresponding to application No. PCT/JP2004/010597 dated Nov. 2, 2004.

* cited by examiner

*Primary Examiner*—Bipin Shalwala
*Assistant Examiner*—Afroza Y Chowdhury
(74) *Attorney, Agent, or Firm*—RatnerPrestia

(57) ABSTRACT

Herein disclosed is a display controlling apparatus, comprising: data output units (140) to be electrically connectable to respective display apparatuses; an information inputting unit (110) to be operable to have inputted therein information to be required for said display apparatuses to display on screens; a controlling unit (120) for producing contents to be displayed by said display apparatuses from said information inputted by said information inputting unit; and a video memory (130) having stored therein said contents produced by said controlling unit, wherein said controlling unit (120) is operative to adjust the resolution of each of said contents to be displayed by said display apparatuses on the basis of the number of said display apparatuses electrically connected to said signal outputting units, and to output said contents to be displayed at said adjusted resolution by said display apparatuses through said data output units (140).

5 Claims, 11 Drawing Sheets

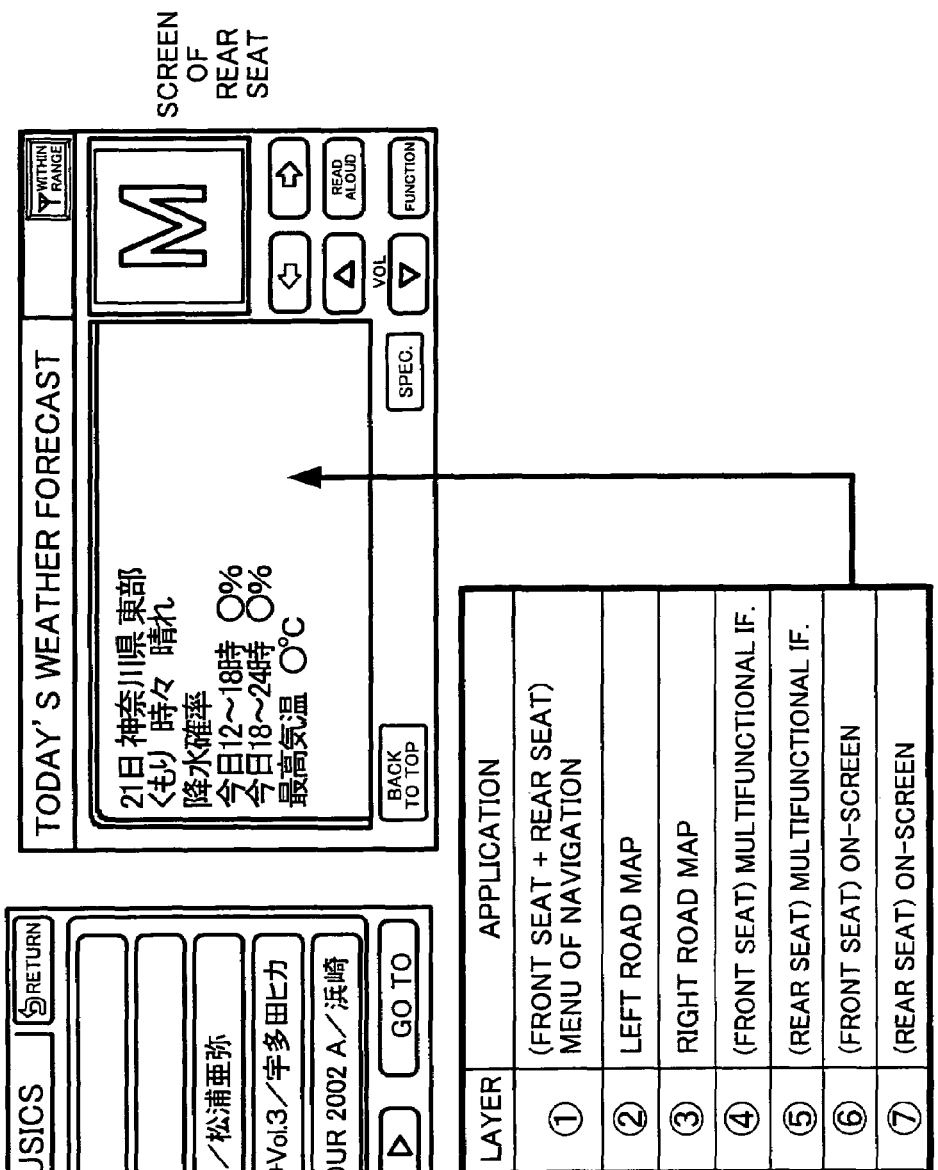
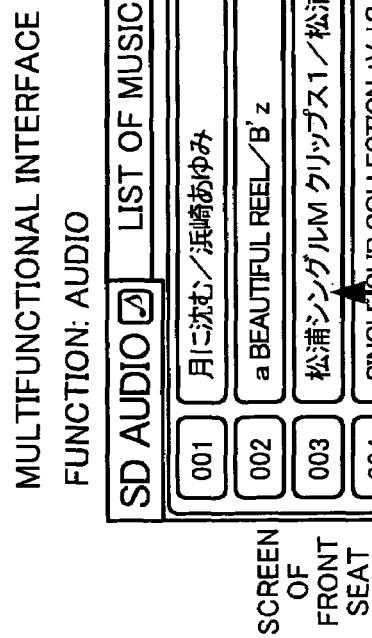
FIG.7

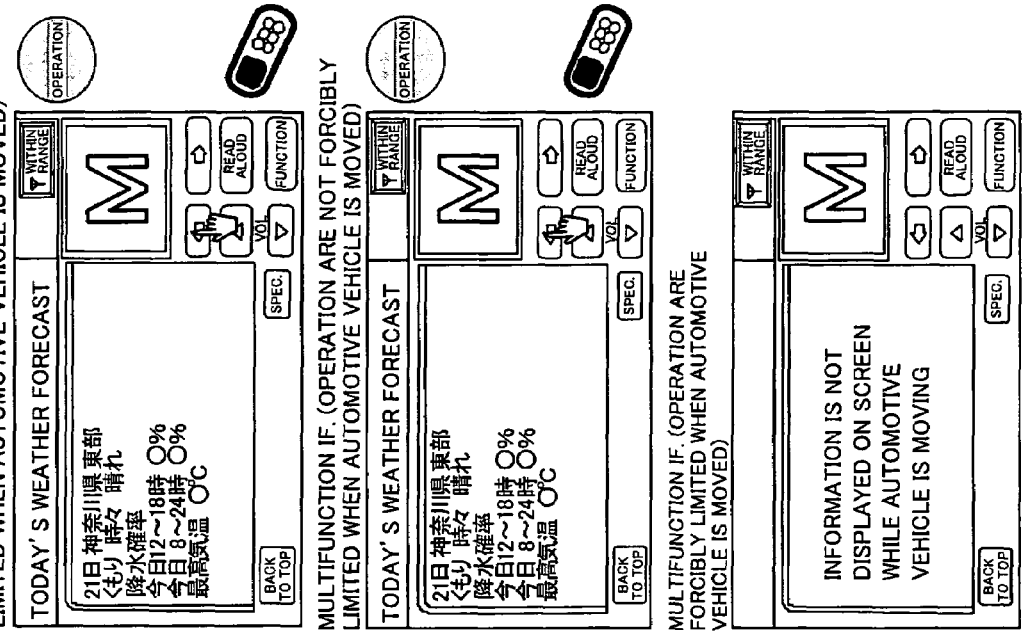
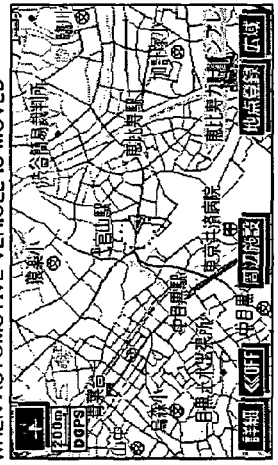
FIG.10

US 7,439,964 B2

SCREEN DISPLAY DEVICE

TECHNICAL FIELD OF THE INVENTION

The present invention relates to a display controlling apparatus, and more particularly to a display controlling apparatus for allowing images to be displayed by display apparatuses.

DESCRIPTION OF THE RELATED ART

As one of conventional display controlling apparatuses, there is well known a display controlling apparatus which is mounted on an automotive vehicle as allowing a display apparatus to display navigation information on, for example, a road map. In recent years, there have been proposed a wide variety of display controlling apparatuses of this type one typical example of which is disclosed in Japanese Patent Laying-Open Publication No. H10-288528. The above mentioned conventional display controlling apparatus mounted on the automotive vehicle can be operated by not only user who is at the front seat of the automotive vehicle, but also user who is at the rear seat of the automotive vehicle.

As shown in FIG. 11, the conventional display controlling apparatus disclosed in Japanese Patent Laying-Open Publication No. H10-288528 is operative to allow each of display apparatuses 12 and 14 to display information obtained from information source 10. In this case, the central processing unit (CPU) 22 is operative to convert the information obtained from the data source 10 to image data having layers collectively defined as data structure, and to output the image data to two video random access memories (VRAM) 24 and 26 on the basis of its data structure.

In general, the image data to be outputted to the display apparatuses 12 and 14 is firstly stored in line buffers on scanning line basis. The image data stored in the line buffers is then converted to image signals such as for example RGB signal and NTSC signal. The converted image signals are then outputted to the respective display apparatuses. The images represented by the image signals are then displayed on the respective screens of the display apparatuses.

The conventional display controlling apparatus thus constructed as previously mentioned, however, encounters such a problem that the conventional display controlling apparatus is large and complicated in construction by reason that the image signals to be outputted to the display apparatuses are respectively produced by the controlling units each comprises VRAM, line buffer, and other elements.

It is, therefore, an object of the present invention to provide a display controlling apparatus which can be simple in construction without being affected by the number of the display apparatuses.

DISCLOSURE OF THE INVENTION

In accordance with a first aspect of the present invention, there is provided a display controlling apparatus, comprising: data output units to be electrically connectable to respective display apparatuses; an information inputting unit to be operable to have inputted therein information to be required for the display apparatuses to display on screens; a controlling unit for producing contents to be displayed by the display apparatuses from the information inputted by the information inputting unit; and a video memory having stored therein the contents produced by the controlling unit, wherein the controlling unit is operative to output the contents stored in the video memory to the display apparatuses through the data output units.

The display controlling apparatus thus constructed as previously mentioned can allow the images to be respectively displayed by the display apparatuses by reason that the controlling unit is operative to allow the images to be displayed by the display apparatuses by controlling the video memory and the signal outputting units electrically connected to the display apparatuses.

In the display controlling apparatus according to the present invention, the controlling unit may be operative to adjust the resolution of each of the contents to be displayed by the display apparatuses on the basis of the number of the display apparatuses electrically connected to the signal outputting units, and to output the contents to be displayed at the adjusted resolution by the display apparatuses through the data output units. On the other hand, the controlling unit may be operative to maintain the resolution of each of the contents to be displayed by the display apparatuses when the judgment is made that the number of the display apparatuses is equal to one.

The display controlling apparatus thus constructed as previously mentioned can effectively utilize the capacity of the video memory by reason that the controlling unit is operative to adjust the resolution of each of the contents to be displayed by the display apparatuses on the basis of the number of the display apparatuses electrically connected to the signal outputting units.

In accordance with a second aspect of the present invention, there is provided a display controlling apparatus, comprising: data output units to be electrically connectable to respective display apparatuses; an information inputting unit to be operable to have inputted therein data to be required for the display apparatuses to display on screens; a controlling unit for producing image data on contents to be displayed by the display apparatuses on the basis of the information inputted by the information inputting unit; and a video memory having stored therein the image data produced by the controlling unit, wherein the controlling unit is operative to output the contents to the display apparatuses through the data output units on the basis of the image data stored in the video memory.

The display controlling apparatus thus constructed as previously mentioned can allow the images to be respectively displayed by the display apparatuses by reason that the controlling unit is operative to allow the images to be respectively displayed by the display apparatuses by controlling the video memory and the signal outputting units electrically connected to the display apparatuses.

In the display controlling apparatus according to the present invention, the image data may have layers to be collectively defined as data structure. Each of the contents to be displayed by the display apparatuses may be constituted by data assigned to one or more of the layers.

The display controlling apparatus thus constructed as previously mentioned can easily produce the image from the data stored in the video memory on the basis of the layers of the data stored in the video memory in response to an instruction to each of the display controlling apparatus to produce the image to be displayed on the screen.

In the display controlling apparatus according to the present invention, the controlling unit may be operative to allow the contents to be sequentially received by the display apparatuses through the data output units in order of the data output units electrically connected to the display apparatuses in a period of a synchronization signal.

The display controlling apparatus thus constructed as previously mentioned can sequentially output the contents stored in the video memory to the display apparatuses in order of the signal outputting units electrically connected to the display apparatuses by switching the contents to be outputted to the display apparatuses on the basis of the period of the synchronization signal.

In the display controlling apparatus according to the present invention, the number of the display apparatuses electrically connected to the data output units may be equal to two. The controlling unit may be operative to allow the contents to be received by one of the two display apparatuses on each of leading edges of the synchronization signal, and to allow the contents to be received by the other of the two display apparatuses on each of trailing edges of the synchronization signal.

The display controlling apparatus thus constructed as previously mentioned can allow the image data to be received by one of the two display apparatuses on each of leading edges of the synchronization signal, and to allow the image data to be received by the other of the two display apparatuses on each of trailing edges of the synchronization signal.

In the display controlling apparatus according to the present invention, each of the display apparatuses electrically connected to the data output units may have an operating unit for issuing an instruction to the controlling unit to select one or more contents. The controlling unit may be operative to judge whether or not one or more contents selected by one of the display apparatuses are the same as one or more contents which are being outputted to the other of the display apparatuses, and to allow one of the display apparatuses to display information on whether or not one or more contents selected by one of the display apparatuses are the same as one or more contents which are being outputted to the other of the display apparatuses in response to the instruction issued by the operating unit of one of the display apparatuses.

When the judgment is made that one or more contents selected by one of the display apparatuses are the same as one or more contents which are being outputted to the other of the display apparatuses, the display controlling apparatus thus constructed as previously mentioned can produce information that one or more contents selected by one of the display apparatuses are the same as one or more contents which are being outputted to the other of the display apparatuses, and to allow the information to be displayed by one of the display apparatuses.

In the display controlling apparatus according to the present invention, each of the display apparatuses electrically connected to the data output units has an operating unit for issuing an instruction to the controlling unit to select one or more contents. The controlling unit may be operative to judge whether or not one or more contents selected by one of the display apparatuses are the same as one or more contents which are being utilized through the operating unit to the other of the display apparatuses, and to allow one of the display apparatuses to display information on whether or not one or more contents selected by one of the display apparatuses are the same as one or more contents which are being outputted to the other of the display apparatuses in response to the instruction issued by the operating unit of one of the display apparatuses.

The display controlling apparatus thus constructed as previously mentioned can allow the contents displayed by one of the display apparatuses, and to be utilized by the user with the restriction on the use of the contents by having one of the display apparatuses display the information that one or more contents selected by one of the display apparatuses are the same as one or more contents which are being outputted to the other of the display apparatuses.

In the display controlling apparatus according to the present invention, the information displayed by one of the display apparatuses may be represented by a pointer.

The display controlling apparatus thus constructed as previously mentioned can improve the usability of the apparatus by allowing the pointer to be displayed on the screen, and to point the operation to be performed by the display apparatus.

In the display controlling apparatus according to the present invention, the controlling unit may be operative to allow one or more contents to be utilized through one of the display apparatuses with the restriction on the use of the contents after allowing one of the display apparatuses to display the information that one or more contents selected by one of the display apparatuses are the same as one or more contents which are being outputted to the other of the display apparatuses.

When one or more contents selected by one of the display apparatuses are the same as one or more contents which are being outputted to the other of the display apparatuses, the display controlling apparatus thus constructed as previously mentioned can allow one or more contents to be continuously utilized through the other of the display apparatuses by allowing one or more contents to be utilized through one of the display apparatuses with the restriction on the use of the contents.

In the display controlling apparatus according to the present invention, each of the display apparatuses may have an operating unit for issuing an instruction to the controlling unit to output one or more contents, the display apparatuses being assigned to respective priority sequences. The controlling unit may be operative to judge whether or not one or more contents which are being outputted to one of the display apparatuses are the same as one or more contents selected by the other of the display apparatuses before judging whether or not one of the display apparatuses exceeds in priority sequence the other of the display apparatuses when the judgment is made that one or more contents selected by the other of the display apparatuses are the same as one or more contents which are being outputted to one of the display apparatuses. The controlling unit may be operative to allow the other of the display apparatuses to display one or more contents the same as one or more contents which are being outputted to one of the display apparatuses with the restriction on the utilization of the contents when the judgment is made that one of the display apparatuses exceeds in priority sequence the other of the display apparatuses.

The display controlling apparatus thus constructed as previously mentioned can differentially permit the contents to be utilized by the users through the display apparatuses on the basis of the priority sequence of the display apparatuses.

In the display controlling apparatus according to the present invention, the controlling unit may be operative to allow the priority sequence assigned to each of the display apparatuses to be changeable by one or more operating units of the display apparatuses.

The display controlling apparatus thus constructed as previously mentioned can improve the usability of the apparatus by allowing the priority sequence of the display apparatuses to be changed by one or more users.

In accordance with a third aspect of the present invention, there is provided a display controlling apparatus for allowing display apparatuses to display respective images represented by image data, comprising: a multiplexing unit for multiplexing the image data indicative of the images to be displayed by the display apparatuses; a buffer memory having stored therein the multiplexed image data; and demultiplexing unit for demultiplexing the multiplexed image data stored in the buffer memory to output the demultiplexed image data to each of the display apparatuses.

The display controlling apparatus thus constructed as previously mentioned can allow the images to be respectively displayed by the display apparatuses by having the buffer memory store the multiplexed image data.

The display controlling apparatus according to the present invention may further comprises a synchronization signal producing unit for producing a synchronization signal to be constituted by a pulse string having a predetermined period. The demultiplexing unit may be operative to demultiplex the multiplexed image data stored in the buffer memory by allowing the multiplexed image data to be selectively received by each of the display apparatuses in the predetermined period of the synchronization signal.

The display controlling apparatus according to the present invention may further comprises a synchronization signal producing unit for producing a synchronization signal to be constituted by a pulse string having a predetermined period. The demultiplexing unit may be operative to demultiplex the multiplexed image data stored in the buffer memory by allowing the multiplexed image data to be received by one of the two display apparatuses on each of leading edges of the synchronization signal, and to be received by the other of the two display apparatuses on each of trailing edges of the synchronization signal.

The display controlling apparatus thus constructed as previously mentioned can allow the images to be displayed by the display apparatuses by allowing the multiplexed image data to be demultiplexed at the predetermined period of the synchronization signal.

In the display controlling apparatus according to the present invention, the multiplexing unit may be operative to adjust the resolution of each of the images to be respectively displayed by the display apparatuses on the basis of the number of the display apparatuses electrically connected to the data output units to multiplex image data indicative of the images to be respectively displayed by the display apparatuses at the adjusted resolution.

In the display controlling apparatus according to the present invention, the multiplexing unit may be operative to adjust the resolution of each of the images to be respectively displayed by the display apparatuses in inverse proportional relationship with the number of the display apparatuses electrically connected to the data output units.

The display controlling apparatus thus constructed as previously mentioned can prevent the information on the contents stored in the video memory from being increased in proportion to the number of the display apparatuses by adjusting the volume of the information to be outputted to each of the display apparatuses on the basis of the number of the display apparatuses even if two or more of the data output units are eclectically connected to the respective display apparatuses.

BRIEF DESCRIPTION OF THE DRAWINGS

The features and advantages of the display controlling apparatus according to the present invention will be more clearly understood from the following description taken in conjunction with the accompanying drawings:

FIG. 7 is a schematic view showing images displayed by the display apparatuses provided with front and rear seats of an automotive vehicle;

FIG. 10 is a schematic view showing images displayed by the display apparatuses provided with front and rear seats of an automotive vehicle.

DESCRIPTION OF THE PREFERRED EMBODIMENTS

The first to third embodiments of the display controlling apparatus according to the present invention will be described hereinafter in accordance with accompanying drawings.

First Embodiment

Figure 1:
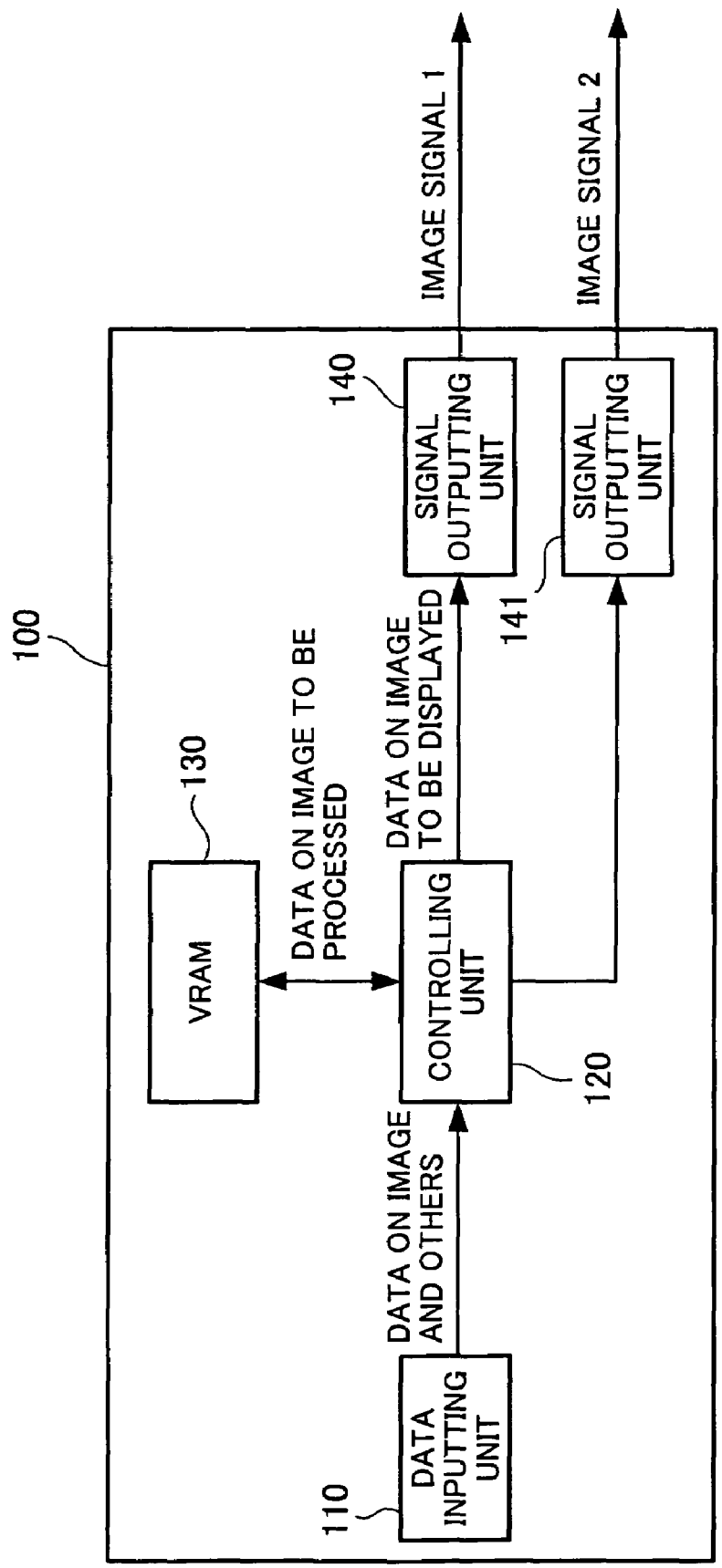
FIG. 1 is a functional diagram showing the display controlling apparatus according to the first embodiment of the present invention.

The display controlling apparatus 100 according to the first embodiment of the present invention is shown in FIG. 1 as comprising data output units 140 and 141 to be electrically connectable to respective display apparatuses, an information inputting unit 110 to be operable to have inputted therein information to be required to display on screens of the display apparatuses, a controlling unit 120 for producing contents to be displayed by the display apparatuses on the basis of the information inputted by the information inputting unit 110, a video memory (hereinafter simply referred to as "VRAM" (Video Random Access Memory)) 130 having stored therein the contents produced by the controlling unit 120. The controlling unit 120 is operative to output the contents stored in the video memory 130 to the display apparatuses through the data output units 140 and 141 to ensure that the contents produced by the controlling unit 120 are displayed by the display apparatuses.

As sown in FIG. 1, the information inputting unit 110 is operative to allow the controlling unit 120 to receive the data of a road map, the data of an operating panel, and other image data (these data being shown as images and others in FIG. 1).

Here, the controlling unit 120 may be operative to produce data to be required to produce the contents (hereinafter simply referred to as "drawing data"), and to store the drawing data in the VRAM 130. The drawing data produced by the controlling unit 120 on the basis of the information inputted by the information inputting unit 110 may have layers collectively defined as "data structure". The controlling unit 120 may be operative to produce each of the contents to be displayed by the display apparatuses from the data assigned to one or more layers. The controlling unit 120 is operative to output data with respect to each of frames (hereinafter simply referred to as "frame data") of each of the contents to be displayed by the display apparatuses in order of the display apparatuses on frame basis to the data output units 140 and 141.

Figure 2:
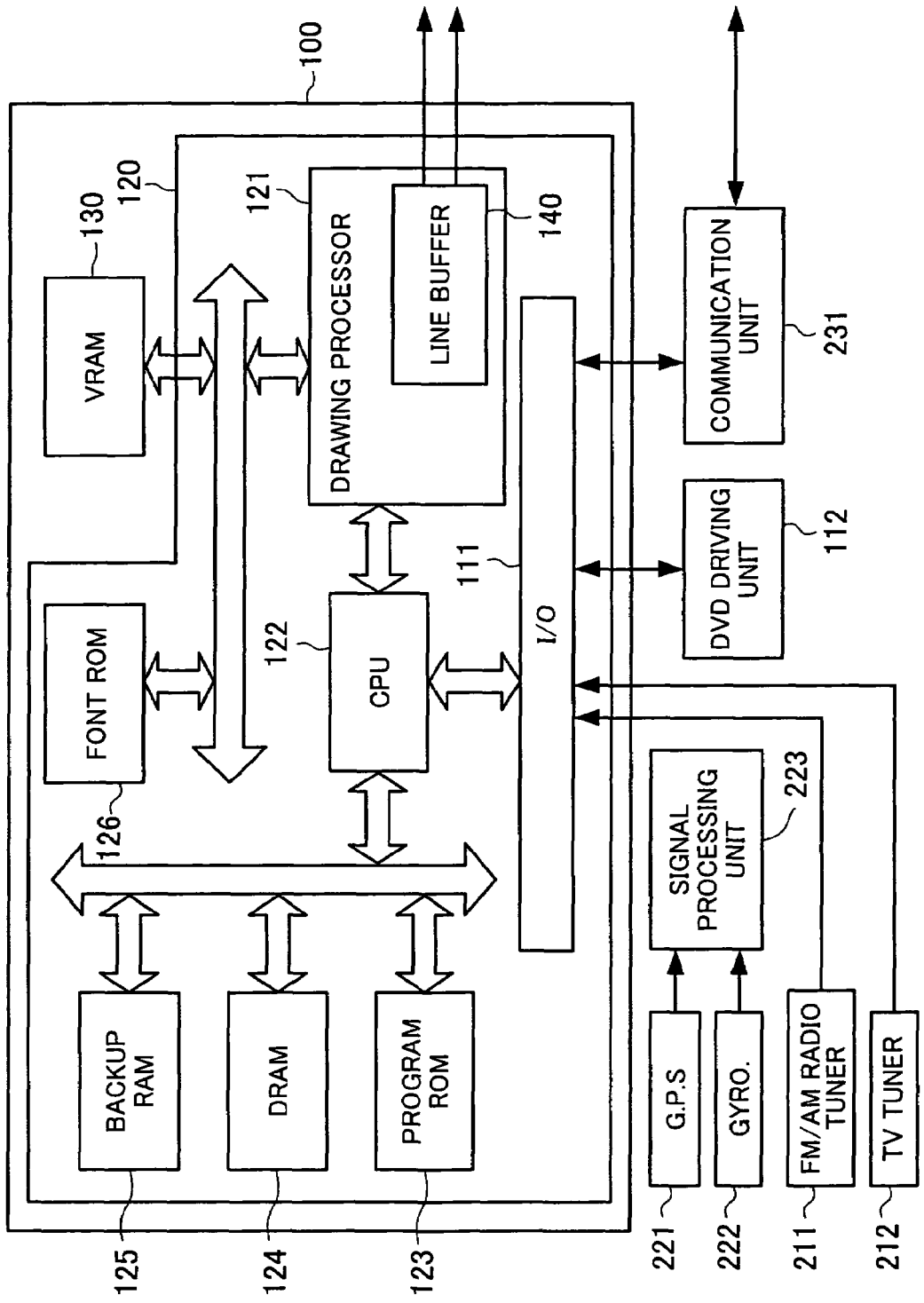
FIG. 2 is a hardware diagram showing the display controlling apparatus according to the first embodiment of the present invention.

As shown in FIG. 2, the display controlling apparatus 100 according to the first embodiment of the present invention may be constituted by specific elements. As an example, the information inputting unit 110 is constituted by an input and output interface device (shown as "I/O" in FIG. 2) 111 and a digital versatile disc (DVD) driving device 112. The information inputting unit 110 is operative to receive data from the DVD driving device 112 through the input and output interface device 111, and to output the data to the controlling unit 120. Here, the display controlling apparatus 100 according to the present invention may be constituted as part of a navigation apparatus to be mounted on an automotive vehicle. The information inputting unit 110 of the display controlling apparatus 100 constituted as part of the navigation apparatus may be operative to receive information on road map and navigation menu from the DVD driving device 112 through the input and output interface device 111. Additionally, the input and output interface device 111 may be electrically connected to a hard disk driving device and a video camera. The information inputting unit 110 may be operative to receive information on the contents from each of the hard disk driving device and the video camera through the input and output interface device 111, and to output the information on the contents to the controlling unit 120.

As shown in FIG. 2, the controlling unit 120 includes a drawing processor 121 for processing the data on images, a central processing unit (CPU) 122 for processing the data on control, a program read only memory (program ROM) 123 having stored therein a predetermined program to be executed by the drawing processor 121 or the CPU 122, a random access memory (RAM) 124, a backup RAM 125 to be provided as a memory having stored therein backup data, and a font ROM 126 to be provided as a memory having stored therein the data of font to be required to produce the contents.

Here, the drawing processor 121 may be constituted by a large scale integrated (LSI) circuit device. The drawing processor 121 may be operative to receive the control program and data from the program ROM 123, the DRAM 124, the font ROM 126, and other memory media through the CPU 122, and to process the data on the basis of the received control program. The drawing processor 121 is operative to produce the frame data to be outputted in synchronization with a synchronization signal to the display apparatuses 140 and 141. As shown in FIG. 2, the data output units 140 and 141 may be collectively constituted by a line buffer 140. Additionally, the line buffer may be constituted by part of the drawing processor 121.

Figure 3:
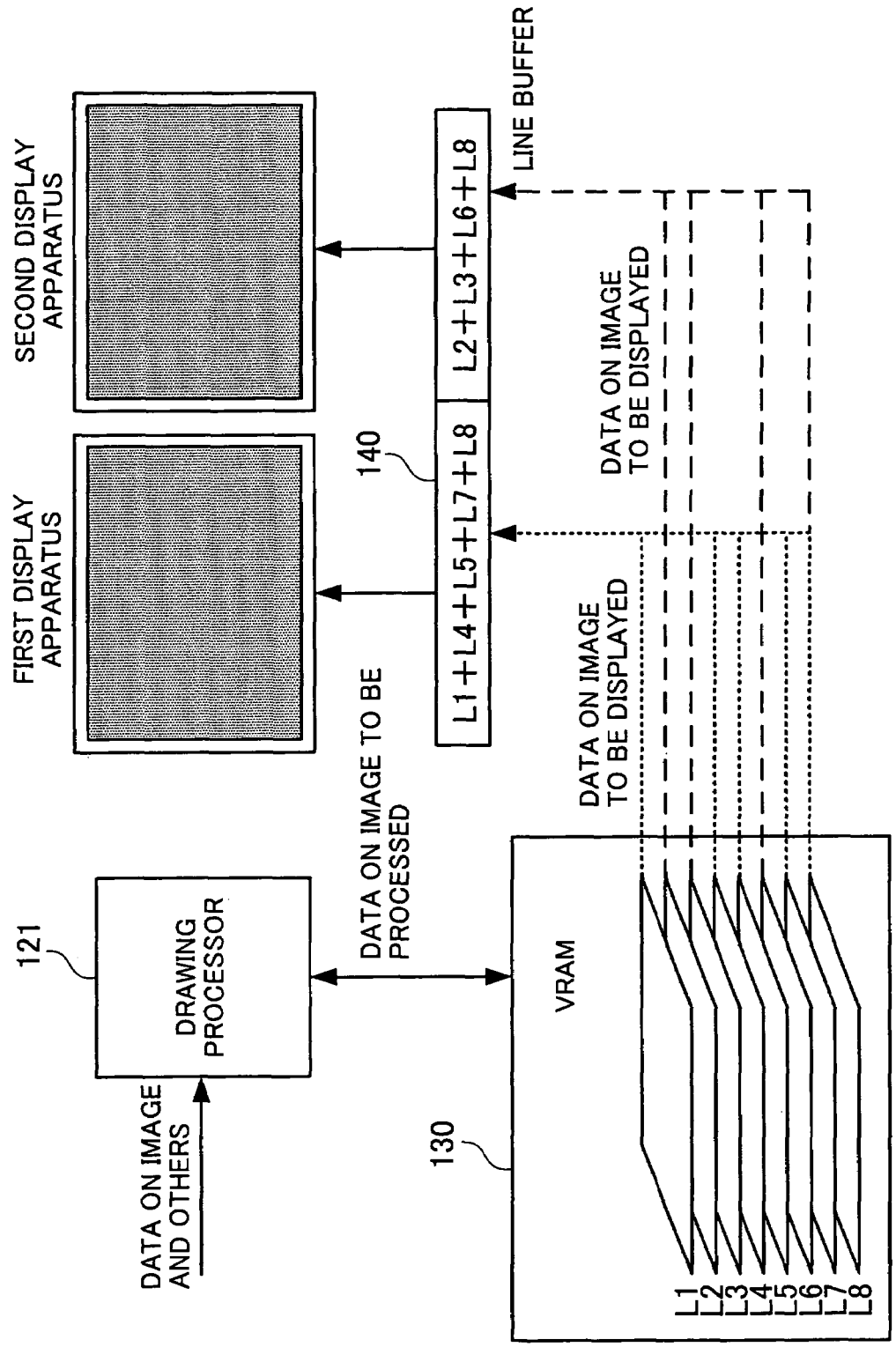
FIG. 3 is a schematic diagram showing an operation to be performed by the display controlling apparatus according to the first embodiment of the present invention.

As shown in FIG. 3, the drawing data produced by the drawing processor 121 has layers collectively defined as data structure. Accordingly, the data assigned to each of the layers (for example, L1 to L8 shown in FIG. 3) is stored in the VRAM 130 to form an imaginary block defined in a memory space. The drawing processor 121 is then operated to produce the frame data on the contents to be displayed by the first display apparatus from the layers L1, L4, L5, L7, and L8 of the drawing data stored in the VRAM 130, and to produce the frame data on the contents to be displayed by the second display apparatus from the layers L2, L3, L6, and L8 of the drawing data stored in the VRAM 130. The drawing processor 121 is then operated to allow the line buffer 140 to receive the frame data to be outputted to the first display apparatus and the frame data to be outputted to the second display apparatus on a predetermined timing.

Here, the drawing processor 121 may be operative to determine the resolution of each of the contents to be displayed by the display apparatuses on the basis of the number of the display apparatuses, and to store the image data indicative of the contents to be displayed at the determined resolution in the line buffer 140. More specifically, the drawing processor 121 may be operative to reduce the resolution of each of the contents to be displayed by the display apparatuses to one-half when the judgment is made that two of the data output units are electrically connected to respective display apparatuses, and to reduce the resolution of each of the contents to be displayed by the display apparatuses to one-third when the judgment is made that three of the data output units are electrically connected to respective display apparatuses.

Figure 4:
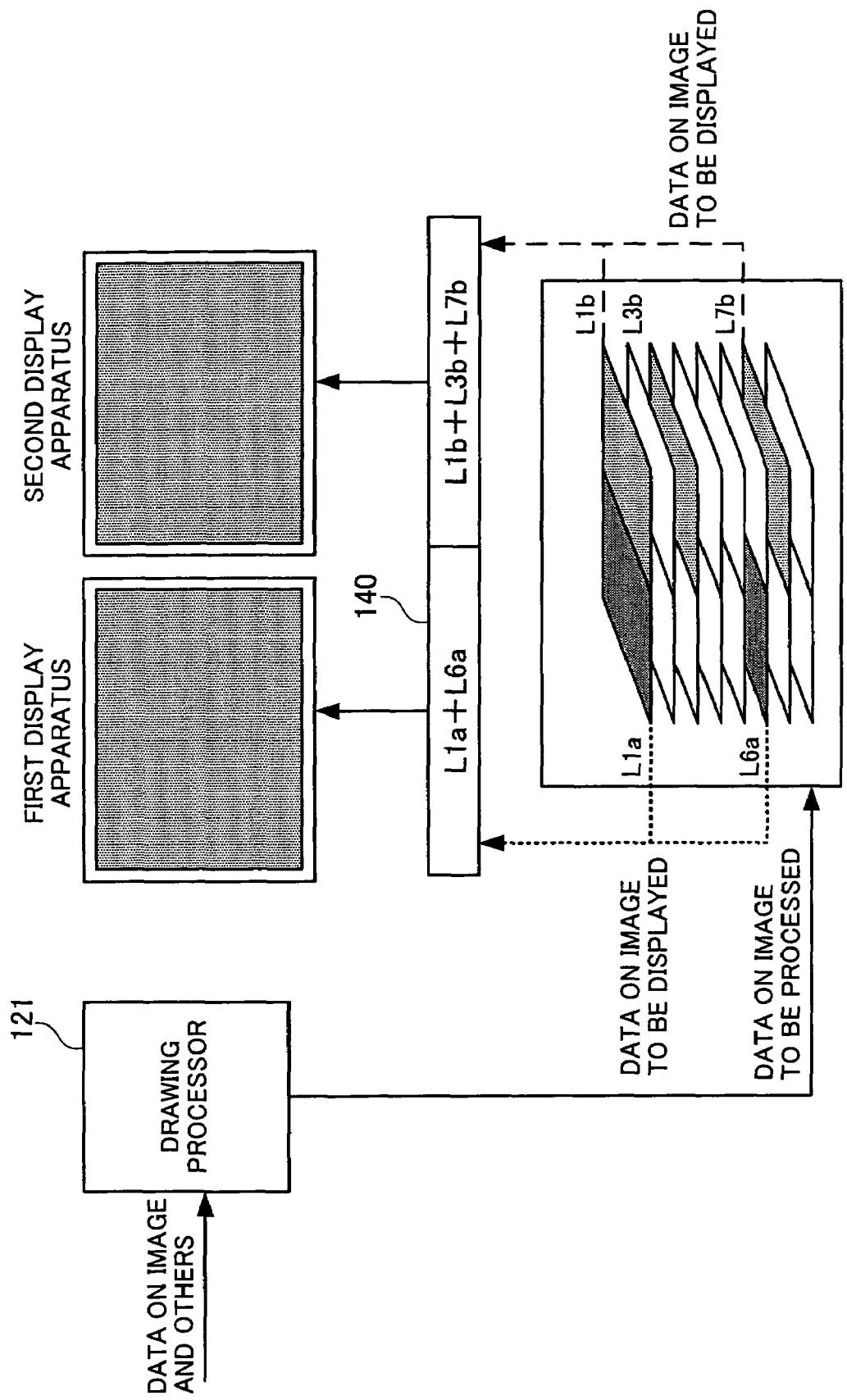
FIG. 4 is a schematic diagram showing an operation to be performed at a half resolution by the display controlling apparatus according to the first embodiment of the present invention.

The following description will be then directed to the case that each of the contents to be displayed by the display apparatuses at the resolution reduced to one-half is produced from the data assigned to one or more layers. As shown in FIG. 4, each of the layers has two parts, one of the two parts being defended as a block assigned to the data to be outputted to the first display apparatus, the other of the two parts being defended as a block assigned to the data to be outputted to the second display apparatus. As two parts of each of the layers L1, L3, L6, and L7, the layer L1 has two parts L1*a* and L1*b*, the layer L3 having two parts L3*a* and L3*b*, the layer L6 having two parts L6*a* and L6*b*, and the layer L7 having two parts L7*a* and L7*b*.

Here, the resolution of each of the contents to be displayed by the display apparatuses may be maintained without being reduced by the controlling unit 120 when the judgment is made that any one of the data output units is electrically connected to only one display apparatus.

Figure 5:
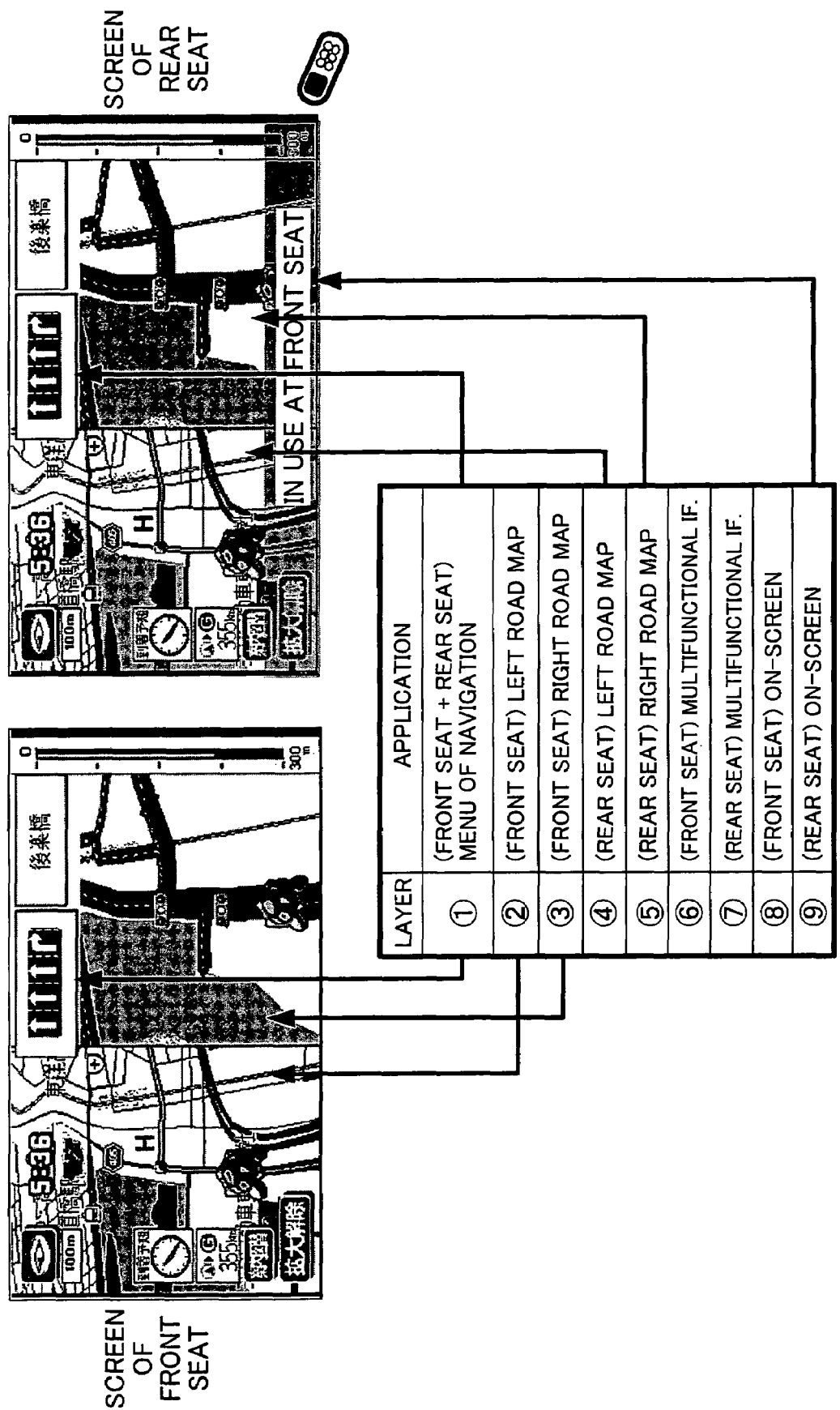
FIG. 5 is a schematic view showing images displayed by the display apparatuses provided with front and rear seats of an automotive vehicle.
Figure 6:
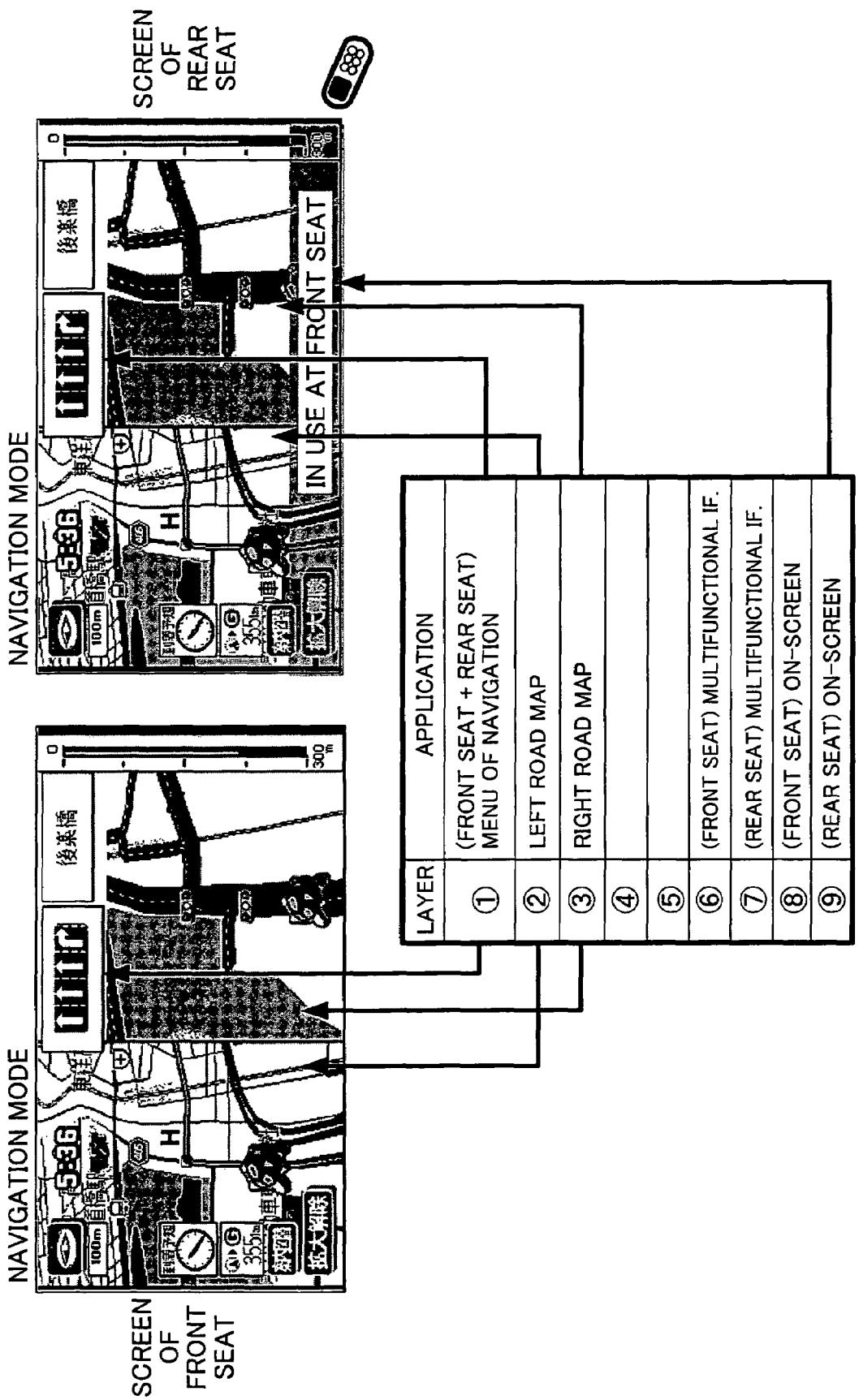
FIG. 6 is a schematic view showing images displayed by the display apparatuses provided with front and rear seats of an automotive vehicle.

FIGS. 5 to 7 are respectively schematic views each showing images displayed on screens of the display apparatuses provided with the display controlling apparatus built in an automotive vehicle, one of the display apparatuses being provided with a front seat of the automotive vehicle, the other of the display apparatuses being provided with rear seat of the automotive vehicle. The navigation menu assigned to the layer 1, the left road map assigned to the layer 2, and the right road map assigned to the layer 3 are synthesized and displayed on the screen of the display apparatus provided with the front seat. The navigation menu assigned to the layer 1, the left road map assigned to the layer 4, the right road map assigned to the layer 5, and an on-screen information assigned to the layer 9 is displayed on the screen of the display apparatus provided with the front seat. Here, the term "on-screen information" is intended to indicate specific message to be displayed on the screen of the display apparatus.

As shown in FIG. 6, the two images are displayed on the respective screens of the display apparatuses provided with the front and rear seats of the automotive vehicle. The navigation menu assigned to the layer 1, the left road map assigned to the layer 2, and the right road map assigned to the layer 3 are collectively displayed on the screen of the display apparatus provided with the front seat. On the other hand, the navigation menu assigned to the layer 1, the left road map assigned to the layer 2, the right road map assigned to the layer 3, and the on-screen information assigned to the layer 9 is displayed on the screen of the display apparatus provided with the rear seat. As will be seen form FIG. 6, the image data (of the layers 1, 2, and 3) is shared by the two display apparatuses.

As shown in FIG. 7, the two images are schematically displayed on the respective screens of the display apparatuses provided with the front and rear seats of the automotive vehicle. The image displayed on the screen of the display apparatus provided with the front seat is indicative of the information on a multi-function interface "audio" assigned to the layer 4. On the other hand, the image displayed on the screen of the display apparatus provided with the rear seat is indicative of the information on a multi-function interface "weather forecast" assigned to the layer 5. In this embodiment, the information on the multi-function interfaces "audio" and "weather forecast" are respectively displayed on the screens of the display apparatuses provided with the front and rear seats of the automotive vehicle. However, the information on the multi-function interfaces may include other audio and images to be displayed by the display apparatuses.

The above mentioned frame data is outputted to the display apparatuses by the line buffer 140 on a predetermined timing. Here, the line buffer 140 is operated to switch to the frame data on the contents to be displayed by the display apparatus and the frame data on the contents to be displayed by the display apparatus on the basis of a period of a synchronization signal. When the judgment is made that the three data output units are electrically connected to the three display apparatuses, the line buffer 140 may be operative to sequentially output the frame data on the contents to be displayed by the first display apparatus, the frame data on the contents to be displayed by the second display apparatus, the frame data on the contents to be displayed by the third display apparatus in order of the three display apparatuses on the basis of the period of the synchronization signal.

Additionally, the signal controlling unit may be operative to allow the contents stored in the video memory to be received by one of the two display apparatuses on each of leading edges of the synchronization signal, and to output each of the contents stored in the video memory to the other of the two display apparatuses on each of trailing edges of the synchronization signal when the judgment is made that there are two display apparatuses each electrically connected to any one of the data output units.

In this embodiment, the display controlling apparatus 100 comprises a line buffer 140, the display controlling apparatus may comprise two or more line buffers which are electrically connected to the respective display apparatuses to allow the contents to be received by the respective display apparatuses.

From the above detail description, it will be understood that the display controlling apparatus according to the first embodiment of the present invention can prevent the information on the contents stored in the video memory from being increased in proportion to the number of the display apparatuses by adjusting the volume of the information to be outputted to each of the display apparatuses on the basis of the number of the display apparatuses even if two or more of the data output units are eclectically connected to the respective display apparatuses by reason that the controlling unit is operative to produce the images to be displayed by the display apparatuses from the data stored in the video memory.

The display controlling apparatus according to the first embodiment of the present invention can effectively utilize the video memory by reason that the controlling unit is operative to adjust the resolution of each of the contents to be displayed by the display apparatuses on the basis of the number of the display apparatuses electrically connected to the signal outputting units.

The display controlling apparatus according to the first embodiment of the present invention can easily produce the contents from the data stored in the video memory on the basis of the layers of the data stored in the video memory in response to an instruction to each of the display controlling apparatus to produce the contents to be displayed on the screen.

The display controlling apparatus according to the first embodiment of the present invention can sequentially output the contents stored in the video memory to the display apparatuses in order of the signal outputting units electrically connected to the display apparatuses by switching the contents to be outputted to the display apparatuses on the basis of the period of the synchronization signal, and to allow the images to be displayed on the respective screens by the display apparatuses on the basis of the contents at the same time.

The display controlling apparatus according to first embodiment of the present invention can allow the contents stored in the video memory to be received by one of the two display apparatuses on each of leading edges of the synchronization signal, and to output each of the contents stored in the video memory to the other of the two display apparatuses on each of trailing edges of the synchronization signal when the judgment is made that there are two display apparatuses each electrically connected to any one of the data output units.

Second Embodiment

The second embodiment of the display controlling apparatus according to the present invention will be then described hereinafter with reference to FIG. 8.

Figure 8:
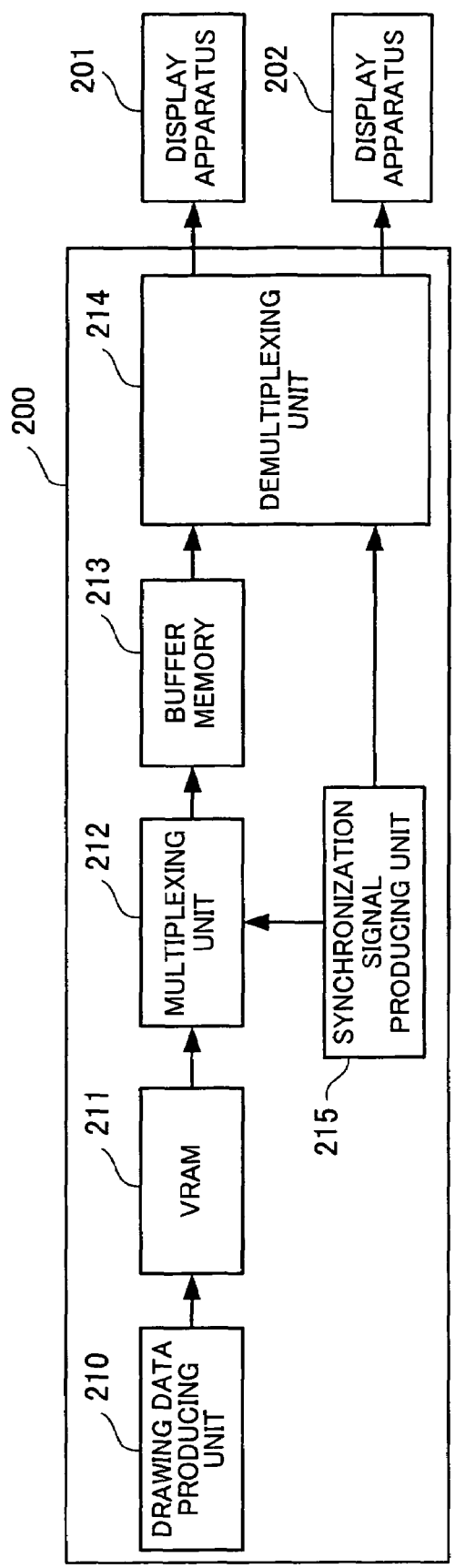
FIG. 8 is a functional diagram showing the display controlling apparatus according to the second embodiment of the present invention.

As shown in FIG. 8, the display controlling apparatus 200 according to the second embodiment of the present invention is operative to output image data to two display apparatuses 201 and 202 to have the display apparatuses 201 and 202 to display respective images to be displayed on the screens by the display apparatuses 201 and 202. In this embodiment, the display controlling apparatus 200 shown in FIG. 8 is operative to output image data to two display apparatuses 201 and 202. However, the display controlling apparatus according to the present invention may be operative to output image data to three or more display apparatuses.

The display controlling apparatus 200 comprises a drawing data producing unit 210 for producing drawing data indicative of images to be displayed on respective screens of the display apparatuses 201 and 202, a video random access memory (VRAM) 211 having stored therein the drawing data produced by the drawing data producing unit 210, a multiplexing unit 212 for multiplexing the drawing data stored in the VRAM 211, a buffer memory 213 for buffering the drawing data multiplexed by the multiplexing unit 212, a demultiplexing unit 214 for demultiplexing the drawing data to be outputting to the display apparatuses 201 and 202, and a synchronization signal producing unit 215 for producing a synchronization signal having a periodic pulse string.

The drawing data producing unit 210 is operative to produce the drawing data of a road map, the drawing data of an operating panel, and other drawing data such as for example an image and a text, and to output the drawing data to the VRAM 211.

The multiplexing unit 212 is operative to multiplex the drawing data on the images to be displayed by the display apparatuses 201 and 202 by sequentially and selectively receiving the drawing data from the VRAM 211 on scanning line basis or pixel basis.

Here, the multiplexing unit 212 may be operative to selectively receive the drawing data from the VRAM 211 on pixel basis in order of the signal outputting units electrically connected to the display apparatuses 201 and 202. The multiplexing unit 212 may be operative to selectively receive the drawing data from the VRAM 211 on scanning line of each of the display apparatuses 201 and 202.

The multiplexing unit 212 is operative to determine the resolution of each of the images to be displayed on the respective screens of the display apparatuses 201 and 202 on the basis of the number of the display apparatuses 201 and 202. More specifically, the multiplexing unit 212 is operative to determine the resolution of each of the images to be displayed on the respective screens of the display apparatuses 201 and 202 in inverse proportion to the number of the display apparatuses 201 and 202.

The buffer memory 213 is operative to output the drawing data to each of the display apparatuses 201 and 202 on a respective timing by buffering the drawing data to be outputted to each of the display apparatuses 201 and 202.

The demultiplexing unit 214 is operative to demultiplex the multiplexed data by allowing the multiplexed data to be sequentially received by the display apparatuses 201 and 202 in order of the display apparatuses 201 and 202.

More specifically, the demultiplexing unit 214 is operative to demultiplex the multiplexed data by switching the display apparatuses 201 and 202 on the basis of the period of the synchronization signal. Additionally, the demultiplexing unit 214 is operative to allow the multiplexed data to be received by one of the display apparatuses 201 and 202 on each of leading edges of the synchronization signal, and to allow the multiplexed data to be received by the other of the display apparatuses 201 and 202 on each of trailing edges of the synchronization signal.

The display controlling apparatus 200 thus constructed as previously mentioned is substantially the same in construction as the display controlling apparatus 100 according to the first embodiment of the present invention. As shown in FIG. 2, the I/O 111 and the CPU 122 are collectively constituted by the drawing data producing unit 210. The VRAM 130 is replaced by the VRAM 211. The drawing processor 121 is constituted by the multiplexing and demultiplexing units 212 and 214. The buffer memory 213 is replaced by the line buffer 140. The synchronization signal producing unit 215 is constituted by the CPU 122.

Figure 9:
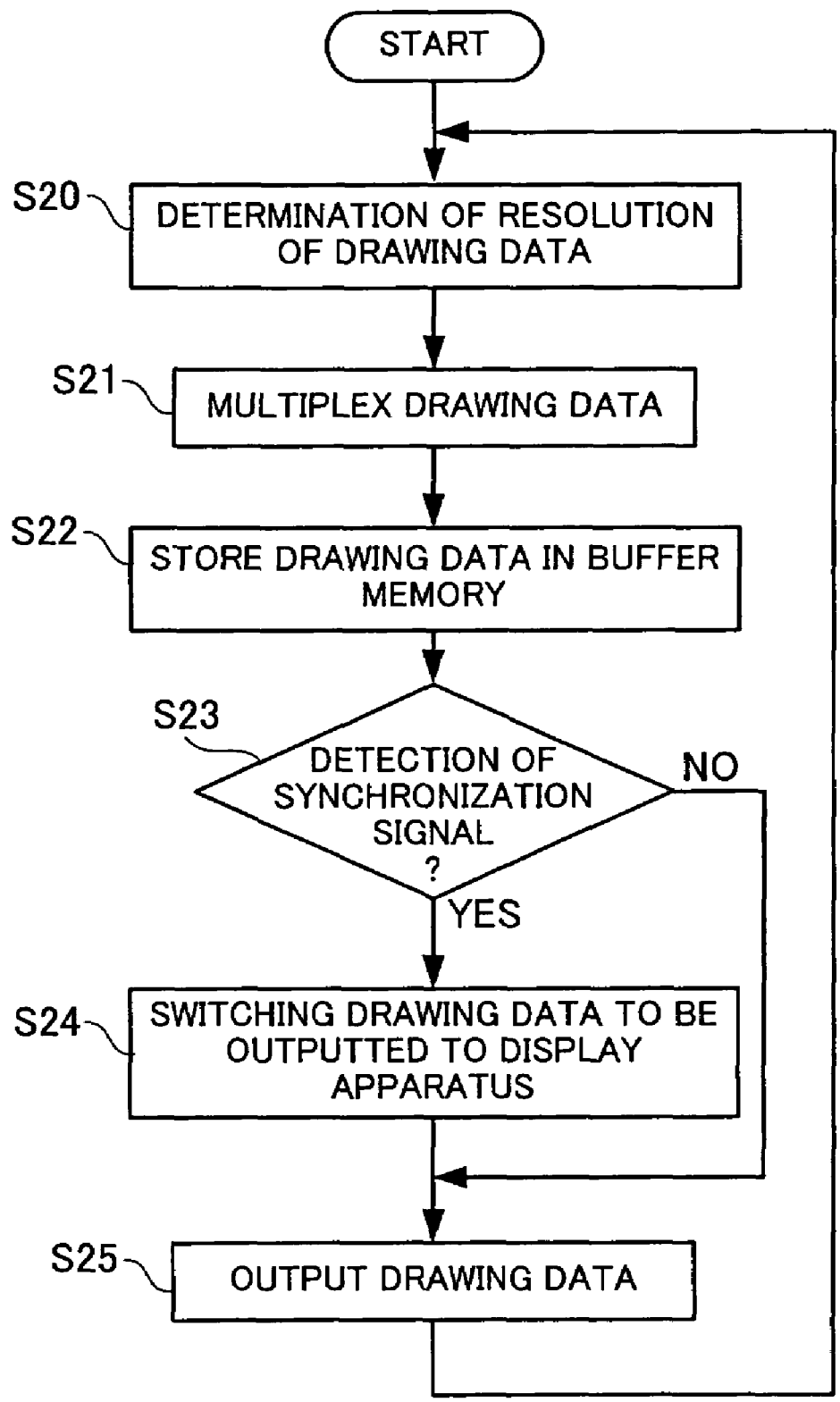
FIG. 9 is a flowchart showing an operation of the display controlling apparatus according to the second embodiment of the present invention.
Figure 11:
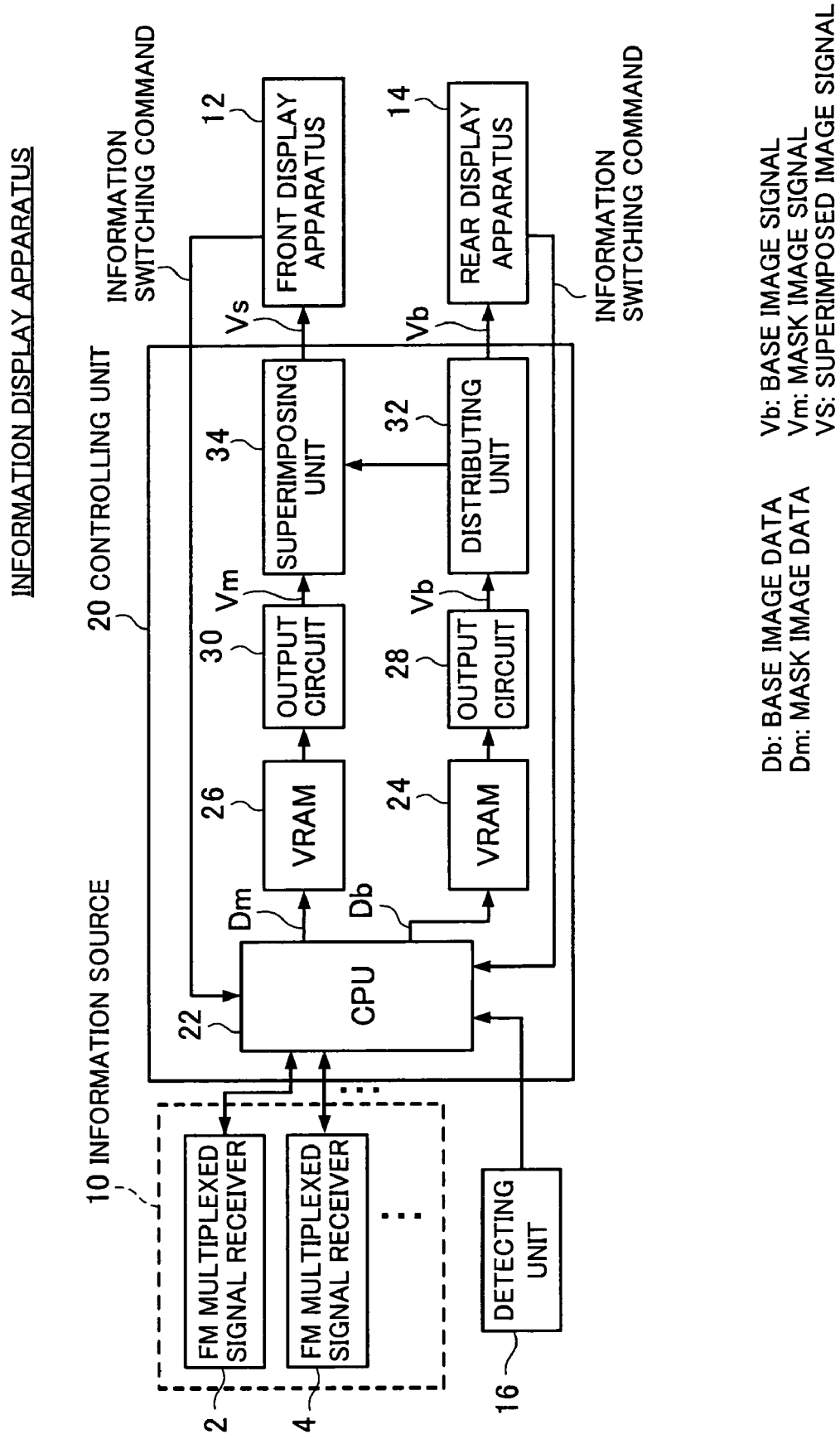
FIG. 11 is a block diagram showing the conventional display controlling apparatus.

The operation of the display controlling apparatus 200 thus constructed as previously mentioned will be then described hereinafter with reference to FIG. 9. In this embodiment, the drawing data is produced and stored in the VRAM 211 by the drawing data producing unit 210, while the drawing data stored in the VRAM 211 is demultiplexed and outputted to the display apparatuses 201 and 202.

The resolution of the drawing data stored in the VRAM 211 is determined by the demultiplexing unit 212 on the basis of the number of the display apparatuses 201 and 202 (in the step S20). The drawing data in which the resolution is determined by the demultiplexing unit 212 is multiplexed (in the step S21) and stored in the buffer memory 213 by the demultiplexing unit 212 (in the step S22).

The demultiplexing unit 214 is operated to detect each of the leading edges of the synchronization signal and each of the trailing edges of the synchronization signal (in the step S23), and to switch between the drawing data to be outputted to one of the display apparatuses 201 and 202 and the drawing data to be outputted to the other of the display apparatuses 201 and 202 on the basis of the leading edges and each of the trailing edges of the synchronization signal (in the step S24).

When, on the other hand, the judgment is made that the synchronization signal is not detected by the CPU 122, the drawing data is not switched by the CPU 122.

The multiplexed drawing data stored in the buffer memory 213 is selectively outputted to the display apparatuses 201 and 202 by the demultiplexing unit 214 (in the step S25).

From the above detail description, it will be understood that the display controlling apparatus 200 according to the second embodiment of the present invention can have the display apparatuses display images on the respective screens by reason that the multiplexing unit is operative to multiplex the drawing data to store the multiplexed drawing data in the buffer memory 213.

The display controlling apparatus 200 according to the second embodiment of the present invention can allow the images to be displayed by the display apparatuses at the same time by demultiplexing the multiplexed data on the basis of the predetermined period. The display controlling apparatus thus constructed as previously mentioned can prevent the information on the contents stored in the buffer memory 213 from being increased in proportion to the number of the display apparatuses by adjusting the volume of the information to be outputted to each of the display apparatuses on the basis of the number of the display apparatuses even if two or more of the data output units are eclectically connected to the respective display apparatuses.

Third Embodiment

The display controlling apparatus according to the third embodiment of the present invention is operative to judge whether or not to allow the contents to be displayed by the display apparatuses on the basis of the judgment on whether or not the automotive vehicle is moving, and to perform the restricted operation by having the display apparatuses display predetermined images when the judgment is made that the automotive vehicle is moving. The constitutional elements of the display controlling apparatus according to the third embodiment are substantially the same as those of the display controlling apparatus 100 according to the first embodiment. Therefore, the constitutional elements of the display controlling apparatus according to the third embodiment the same as those of the display controlling apparatus 100 according to the first embodiment will not be described but bear the same reference numerals and legends as those of the display controlling apparatus 100 according to the first embodiment.

The following description will be firstly directed to the case that the operation is performed by the display controlling apparatus 100 on the basis of the contents required for the display apparatuses to display on the screens. The display controlling apparatus 100 is operative to judge whether or not the contents selected by the display apparatus provided with the front seat of the automotive vehicle (hereinafter simply referred to as "first display apparatus") are the same as the contents which are being displayed on the screen of the display apparatus provided with the rear seat of the automotive vehicle (hereinafter simply referred to as "second display apparatus"), and to allow the first display apparatus to display the information on whether or not the contents selected by the first display apparatus are the same as the contents which are being displayed on the screen of the second display apparatus.

The above mentioned operation of the display controlling apparatus 100 according to the third embodiment of the present invention will be described hereinafter with reference to FIG. 10. As shown in each of FIGS. 10(a) and 10(b), two images displayed by the respective display apparatuses provided with the front and rear seats of the automotive vehicle are indicative of the contents to be watched and utilized by the users. Here, each of the display apparatuses may be operative to allow its operating unit to be operated by the user by displaying an image indicative of functions of the operating unit. The display controlling apparatus 100 may be operative to output the contents to the display apparatuses in response to an instruction issued through the operating unit of each of the display apparatuses. As shown in FIG. 10(*a*), the navigation information is displayed on the screen of the display apparatus provided with the front seat. On the other hand, the multifunctional interface is displayed on the screen of the display apparatus provided with the rear seat.

As will be seen from FIG. 10, the display controlling apparatus 100 is operated to display, as a message to the user, the information about the fact that the multifunctional interface selected by one of the display apparatuses (i.e., the display apparatus provided with the front seat in this case) is the same as the contents which are being displayed on the screen of the other of the display apparatuses (i.e., the display apparatus provided with the rear seat in this case) when the judgment is made that the multifunctional interface selected by the display apparatus provided with the front seat is the same as the contents which are being displayed on the screen of the display apparatus provided with the rear seat. In this case, the message is displayed on the screen of one of the display apparatuses. However, a predetermined symbol indicative of the massage, a predetermined icon indicative of the message, or the like may be displayed on the screen of one of the display apparatuses.

When, for example, the instruction to the display controlling apparatus 100 to output the contents about the multifunctional interface is issued by the operating unit of the display apparatus provided with the front seat, the display controlling apparatus 100 is operated to output the contents about the multifunctional interface to the display apparatus provided with the front seat, and to allow the display apparatus provided with the front seat to display the information about the fact that the multifunctional interface selected by the display apparatus provided with the front seat is the same as the contents which are being displayed on the screen of the other of the display apparatuses. Here, each of the contents may be selected by a pointer or a cursor superimposed on the screen of each of the display apparatuses. The display controlling apparatus may be controlled by a remote controlling unit.

The display controlling apparatus 100 is operative to output the contents to the display apparatuses on the basis of the priority sequence assigned to each of the display apparatuses. The following description will be then directed to the case that the operation is performed by the display controlling apparatus 100 on the basis of the priority sequence assigned to three display apparatuses "A", "B", and "C" electrically connected to the display controlling apparatus 100. Here, the priority order of the display apparatus "A" is high in comparison with the priority order of each of the display apparatuses "B" and "C". The priority order of the display apparatus "C" is low in comparison with the priority order of the display apparatus "B".

The display controlling apparatus 100 is operative to allow the content to be displayed on the screen of the display apparatus "B", and to be utilized with no restriction even if the judgment is made that the content is being displayed on the screen of the display apparatus "B". On the other hand, the display controlling apparatus 100 is operative to allow the content to be displayed on the screen of the display apparatus "C", and to be utilized with predetermined restriction while the content is being displayed on the screen of the display apparatus "B". When one or more specific contents are selected by the user, the display controlling apparatus 100 may be operative to judge whether or not to allow the specific contents to be utilized with no restriction. The priority sequence of the display apparatus provided with the front seat of the automotive vehicle may be high on one or more specific contents such as a navigation of an automotive vehicle in comparison with the priority of the other display apparatuses. The priority sequence of the display apparatuses may be updated by each of the display apparatuses. Similarly, the priority sequence of the contents may be updated by each of the display apparatuses.

The following description will be directed to the case that the operation is performed with the restriction on the use of the contents to be displayed on the screens of the display apparatuses. The display controlling apparatus is operative to allow the contents to be displayed by the first display apparatus and to be utilized by one of the users through the first display apparatus with the restriction on the use of the contents when the judgment is made that the contents selected by the other of the users are the same as the contents which are being utilized by one of the users. More specifically, the display controlling apparatus may be operative to judge whether or not to allow the user to scroll the viewing area on the basis of the contents displayed on the screen of the display apparatus.

The following description will be directed to the case that the display controlling apparatus is operated to allow the contents to be displayed, and to be utilized with the restriction when the automotive vehicle is moving. As shown in FIG. 10(*a*), the display controlling apparatus according to the third embodiment of the present invention is operative to allow the display apparatus provided with the front seat to forcibly display the contents on the navigation on the screen when the judgment is made that the automotive vehicle is moving. As shown in FIG. 10(*c*), the display controlling apparatus according to the third embodiment of the present invention is operative to allow the display apparatus provided with the front seat not to forcibly display the contents on the screen when the judgment is made that the automotive vehicle is moving.

From the above detail description, it will be understood that the display controlling apparatus according to the third embodiment of the present invention can allow one of the display apparatuses to display on the screen the information about the fact that the contents selected by one of the display apparatuses is the same as the contents which is being outputted to the other of the display apparatuses.

When the judgment is made that the contents selected by one of the display apparatuses is the same as the contents which is being outputted to the other of the display apparatuses, the display controlling apparatus according to the third embodiment of the present invention can allow the selected contents to be outputted and displayed on the screen of one of the display apparatus with the information.

The display controlling apparatus according to the third embodiment of the present invention can improve the usability of the system by having each of the display apparatuses display on its screen the respective pointer required to point the operation to be performed.

The display controlling apparatus according to the third embodiment of the present invention can allow the contents to be displayed by one of the display apparatuses and to be utilized by one of the users through one of the display apparatuses without interruption by reason that the display controlling apparatus is operative to allow the contents to be displayed by the other of the display apparatuses and to be utilized by the other of the users through the other of the display apparatuses with the restriction on the use of the contents when the judgment is made that the contents selected by the other of the users are the same as the contents which are being utilized by one of the users.

The display controlling apparatus according to the third embodiment of the present invention can selectively allow the contents to be displayed by the display apparatuses on the basis of the priority sequence assigned to each of display apparatuses.

The display controlling apparatus according to the third embodiment of the present invention can allow the priority sequence assigned to each of display apparatuses to be updated by the user to improve the usability of the system.

INDUSTRIAL APPLICABILITY OF THE PRESENT INVENTION

In accordance with the present invention, there is provided a display controlling apparatus which can be simple in construction in comparison with the conventional apparatus by reason that the controlling unit is operative to control each of the display apparatuses to have the display apparatuses simultaneously display the images to be utilized by the users.

What is claimed is:

1. A display controlling apparatus, being connectable to a predetermined number of display apparatuses, comprising:
   a single video memory for storing image data at an original resolution; and
   a controlling unit for outputting the image data from the single video memory to:
      (a) each of a plurality of display apparatuses at a lower resolution when the predetermined number of display apparatuses is more than one display apparatus, the lower resolution being lower than the original resolution, or
      (b) one display apparatus at the original resolution when the predetermined number of display apparatuses is one display apparatus;
      wherein, the image data includes a plurality of layers,
      at least one layer of the plurality of layers is provided to a first display apparatus of the plurality of display apparatuses, and
      at least one further layer of the plurality of layers is provided to a display apparatus other than the first display apparatus of the plurality of display apparatuses.

2. A display controlling apparatus of claim 1, wherein the lower resolution depends on the predetermined number of display apparatuses.

3. A display controlling apparatus of claim 1, wherein the lower resolution is inversely proportional to the predetermined number of display apparatuses.

4. A display controlling apparatus, being connectable to a predetermined number of display apparatuses, comprising:
   a single video memory for storing image data at an original resolution; and
   a controlling unit for outputting the image data from the single video memory to:
      (a) each of a plurality of display apparatuses at a lower resolution when the predetermined number of display apparatuses is more than one display apparatus, the lower resolution being lower than the original resolution, or
      (b) one display apparatus at the original resolution when the predetermined number of display apparatuses is one display apparatus;
   wherein,
   the image data includes a plurality of layers,
   a portion of at least one layer of the plurality of layers is provided to a first display apparatus of the plurality of display apparatuses, and
   a further portion of the at least one layer of the plurality of layers is provided to a display apparatus other than the first display apparatus of the plurality of display apparatuses.

5. A display controlling apparatus, being connectable to a predetermined number of display apparatuses, comprising:
   a single video memory for storing image data at an original resolution; and
   a controlling unit for outputting the image data from the single video memory to:
      (a) each of a plurality of display apparatuses at a lower resolution when the predetermined number of display apparatuses is more than one display apparatus, the lower resolution being lower than the original resolution, or
      (b) one display apparatus at the original resolution when the predetermined number of display apparatuses is one display apparatus;
   wherein,
   the image data includes a plurality of layers;
   a portion of at least one layer of the plurality of layers is provided to a first display apparatus of the plurality of display apparatuses; and
   a portion of the at least one further layer of the plurality of layers is provided to a display apparatus other than the first display apparatus of the plurality of display apparatuses.

* * * * *